(12) United States Patent
French et al.

(10) Patent No.: US 12,523,806 B2
(45) Date of Patent: Jan. 13, 2026

(54) COLOR FILTER ARRAY AND COLOR ELECTROPHORETIC DISPLAY HAVING THE SAME

(71) Applicant: E Ink Holdings Inc., Hsinchu (TW)

(72) Inventors: Ian French, Hsinchu (TW); Po-Yuan Lo, Hsinchu (TW); Liang-Yu Lin, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 468 days.

(21) Appl. No.: 18/060,971

(22) Filed: Dec. 2, 2022

(65) Prior Publication Data

US 2023/0223414 A1     Jul. 13, 2023

(30) Foreign Application Priority Data

Jan. 10, 2022   (TW) .................................. 111100877

(51) Int. Cl.
  *G02B 5/20*     (2006.01)
  *G02F 1/1677*   (2019.01)

(52) U.S. Cl.
  CPC ............ *G02B 5/201* (2013.01); *G02F 1/1677* (2019.01); *G02F 2201/52* (2013.01)

(58) Field of Classification Search
  CPC .... G02B 5/201; G02F 1/1677; G02F 2201/52
  See application file for complete search history.

(56) References Cited

U.S. PATENT DOCUMENTS

| | | | |
|---|---|---|---|
| 9,355,601 B2 | 5/2016 | Brown Elliott | |
| 9,552,624 B2 | 1/2017 | Kunze | |
| 10,079,255 B1 | 9/2018 | Murad et al. | |
| 10,349,015 B2 | 7/2019 | Fossum et al. | |
| 2003/0117423 A1* | 6/2003 | Brown Elliott | G09G 3/20 345/690 |
| 2007/0040952 A1 | 2/2007 | Roh et al. | |
| 2016/0155776 A1* | 6/2016 | Kabe | H10K 59/353 257/89 |

(Continued)

FOREIGN PATENT DOCUMENTS

| | | |
|---|---|---|
| CN | 1667455 A | 9/2005 |
| CN | 104658464 A | 5/2015 |

(Continued)

OTHER PUBLICATIONS

The office action of corresponding TW application No. 111100877 issued on Feb. 18, 2023.

(Continued)

*Primary Examiner* — George G. King
(74) *Attorney, Agent, or Firm* — CKC & Partners Co., LLC

(57) ABSTRACT

The color filter array includes multiple first color resist, multiple second color resists, and second color resists third color resists. The first color resist have a first color. The second color resists have a second color different from the first color. The third color resists have a third color different from the first color and second color. A reflectance of the third color resists is greater than a reflectance of the first color resists and a reflectance of the second color resists, the first color resists are continuously arranged along a first diagonal direction and a second diagonal direction, and the third color resists are not arranged along the second diagonal direction continuously.

5 Claims, 4 Drawing Sheets

(56) References Cited

U.S. PATENT DOCUMENTS

2019/0271878 A1  9/2019  Tsuruda et al.
2020/0019029 A1  1/2020  Park et al.

FOREIGN PATENT DOCUMENTS

| CN | 104503091 B    | 10/2017 |
| CN | 108333847 A    | 7/2018  |
| CN | 109686764 A    | 4/2019  |
| TW | 201409436 A    | 3/2014  |
| WO | 2004023195 A2  | 3/2004  |

OTHER PUBLICATIONS

The office action of corresponding CN application No. 202210021582.6 issued on Nov. 15, 2025.

\* cited by examiner

COLOR FILTER ARRAY AND COLOR ELECTROPHORETIC DISPLAY HAVING THE SAME

CROSS-REFERENCE TO RELATED APPLICATION

This application claims priority to Taiwan Application Serial Number 111100877, filed Jan. 10, 2022, which is herein incorporated by reference in its entirety.

BACKGROUND

Field of Invention

The present invention relates to a color filter array and a color electrophoretic display.

Description of Related Art

A printed color filter layer is use to filter the light reflected by the display medium layer so as to form the color image in a color electrophoretic display nowadays. However, when the color resists having lower reflectance are arranged close to each other or the arrangement regularity is higher, obvious darker region or texture pattern may be shown in white state and be recognized easily. In addition, if the lengths or the areas of the color resists are greater, color leakage problem may occur and colors of the color resists may be easily shown in the display screen when there is a pattern whose size is close to one sub-pixel region shown in black and white picture.

Accordingly, it is still a development direction for the industry to provide a color filter array which can solve the problems mentioned above.

SUMMARY

One aspect of the present disclosure is a color filter array.

In some embodiments, the color filter array includes multiple first color resist, multiple second color resists, and second color resists third color resists. The first color resist have a first color. The second color resists have a second color different from the first color. The third color resists have a third color different from the first color and second color. A reflectance of the third color resists is greater than a reflectance of the first color resists and a reflectance of the second color resists, the first color resists are continuously arranged along a first diagonal direction and a second diagonal direction, and the third color resists are not arranged along the second diagonal direction continuously.

In some embodiments, the third color resists are arranged along the first diagonal direction continuously.

In some embodiments, the second color resists are continuously arranged along the first diagonal direction and the second diagonal direction.

In some embodiments, an area of each of the third color resists is greater than an area of each of the first color resists and each of the second color resists.

In some embodiments, each of the first color resists has two sides connected with each other, and two of the second color resists are respectively arranged adjacent to the two sides.

In some embodiments, each of the second color resists has two sides connected with each other, and two of the first color resists are respectively arranged adjacent to the two sides.

Another perspective of the present disclosure is a color electrophoretic display.

In some embodiments, the color electrophoretic display includes a display region, a pixel array, a display medium layer, and a color filter array. The display region includes multiple sub-pixel regions. The pixel array corresponds to the display region in position. The display medium layer is located on the pixel array. The color filter array has multiple rows arranged along a first direction and multiple columns arranged along a second direction. The first direction is perpendicular to the second direction, and each of the sub-pixel regions corresponds to the columns and rows of the color filter array. The color filter array includes multiple first color resist, multiple second color resists, and second color resists third color resists. The first color resist have a first color. The second color resists have a second color different from the first color. The third color resists have a third color different from the first color and second color. A reflectance of the third color resists is greater than a reflectance of the first color resists and a reflectance of the second color resists, the first color resists are continuously arranged along a first diagonal direction and a second diagonal direction, and the third color resists are not arranged along the second diagonal direction continuously.

In some embodiments, adjacent two of the first color resists are located at different columns and different rows, and adjacent two of the second color resists are located at different columns and different rows.

In some embodiments, an orthogonal projection of each of the first color resists corresponds to one of the sub-pixel regions, and an orthogonal projection of each of the second color resists corresponds to one of the sub-pixel regions.

In some embodiments, an orthogonal projection of each of the third color resists corresponds to two of the sub-pixel regions.

In some embodiments, each of the first color resists has two sides connected with each other, and two of the second color resists are respectively arranged adjacent to the two sides.

In some embodiments, each of the second color resists has two sides connected with each other, and two of the first color resists are respectively arranged adjacent to the two sides.

In some embodiments, each of the third color resists has two long sides opposite with each other, and each of the long sides is arranged adjacent to one of the first color resists and one of the second color resists.

In some embodiments, an array formed by two of the first color resists and two of the second color resists are located between two of the third color resists along the second direction.

In some embodiments, the first color resists and the second color resists of the array are alternatively arranged.

In some embodiments, the first color resists of the array are arranged in parallel along the second direction, and the second color resists of the array are arranged in parallel along the second direction.

In the aforementioned embodiments, the arrangement regularity of the color filter array can be reduced by making the first color resist and the second color resist arranged alternatively so as to avoid texture pattern of the first color resist and the second color resist shown in white state.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
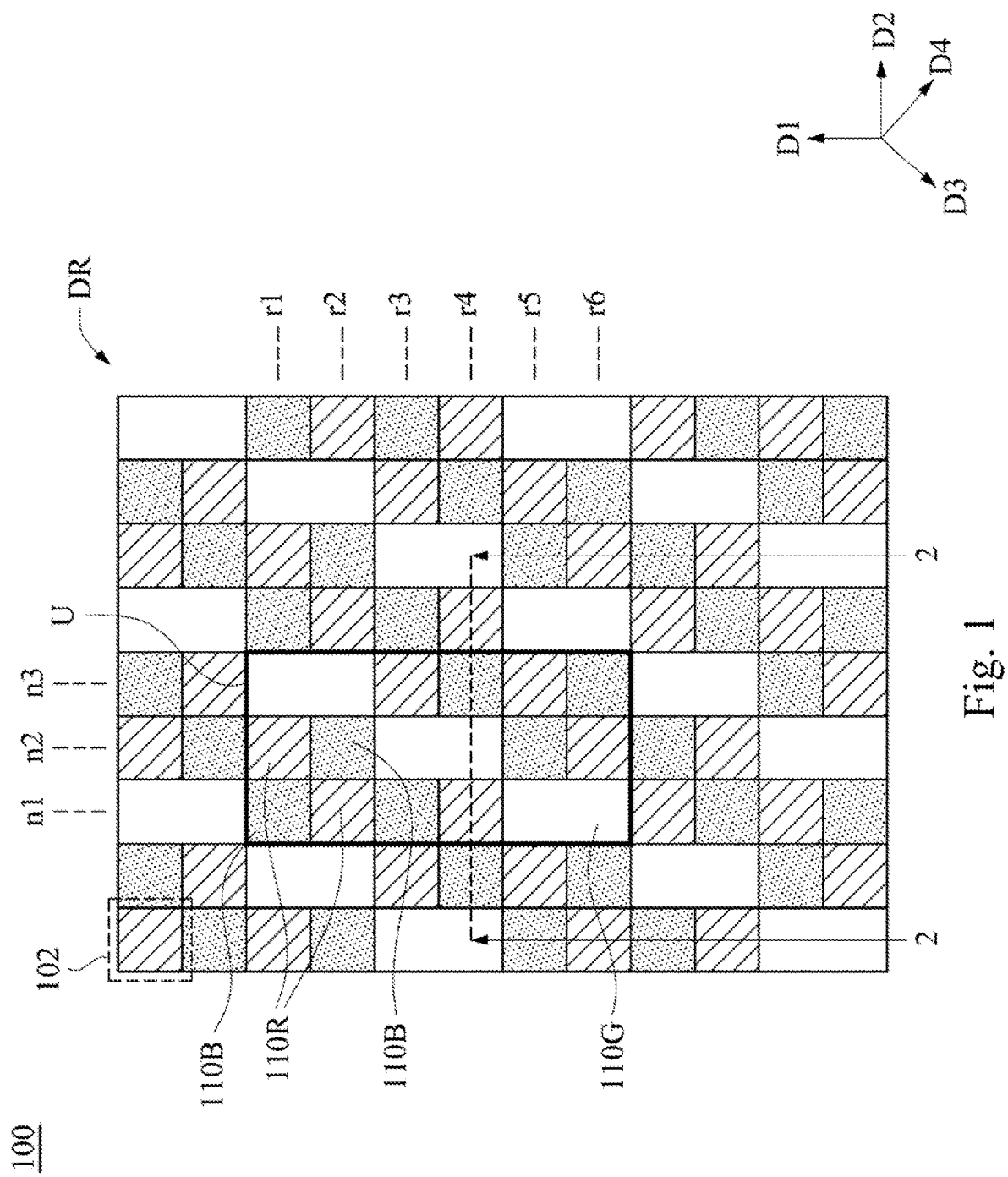
FIG. 1 is a top view of a color electrophoretic display according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
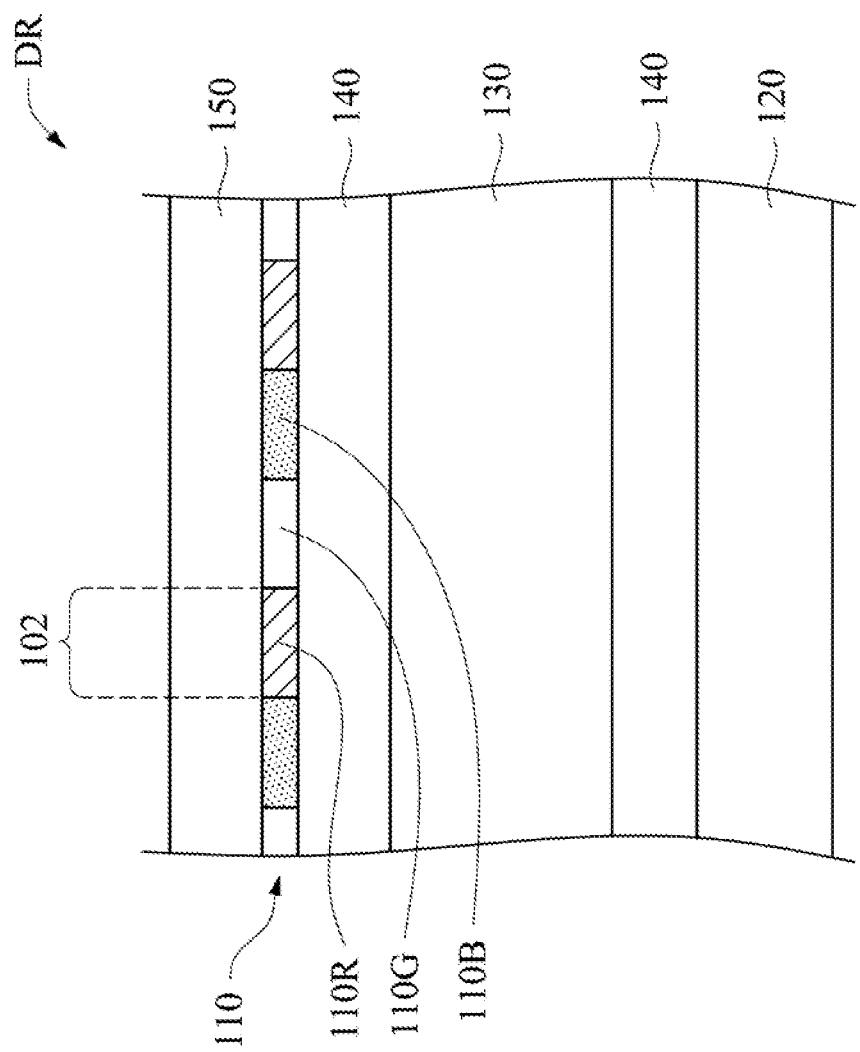
FIG. 2 is a cross-sectional view taken along line 2-2 in FIG. 1.

FIG. 1 is a top view of a color electrophoretic display 100 according to one embodiment of the present disclosure. FIG. 2 is a cross-sectional view taken along line 2-2 in FIG. 1. Reference is made to FIG. 1 and FIG. 2. The color electrophoretic display 100 includes a color filter array 110, a pixel array 120, and a display medium layer 130. The display medium layer 130 is located on the pixel array 120. The color electrophoretic display 100 has a display region DR, and the display region DR includes multiple sub-pixel regions 102. The pixel array 120 corresponds to the sub-pixel regions 102 of the display region DR. The first direction D1 is the present embodiment is the perpendicular direction, the second direction D2 is the horizontal direction, and the first direction D1 is perpendicular to the second direction D2.

As shown in FIG. 2, the color electrophoretic display 100 includes two adhesive layers 140 and a transparent substrate 150. The adhesive layers 140 are located between the pixel array 120 and the display medium layer 130 and between the color filter array 110 and the display medium layer 130. The transparent substrate 150 is located on the color filter array 110. The structural configuration between the aforementioned color filter array 110 and the display medium layer 130 can be changed depends on the practical requirements, and the present disclosure is not limited thereto. For clarity, the transparent substrate 150 is omitted in FIG. 1.

As shown in FIG. 1, the color filter array 110 includes multiple first color resists 110R, multiple second color resists 110B, and multiple third color resists 110G. The first color resists 110R have a first color, the second color resists 110B have a second color, and the third color resists 110G have a third color. For example, in the present embodiment, the first color resists 110R have red color, the second color resists 110B have blue color, and the third color resists 110G have green color, but the present disclosure is not limited thereto. The reflectance of the third color resists 110G is greater than the reflectance of the first color resists 110R, and the reflectance of the first color resists 110R is greater than the reflectance of the second color resists 110B. Specifically, the reflectance of the blue color resists is about 19%~22%, the reflectance of the red color resists is about 22.5%~25.5%, and the reflectance of the green color resists is about 63%~66%.

As shown in FIG. 1, an area of each of the third color resists 110G is greater than an area of the first color resists 110R and an area of the second color resists 110B. In the present embodiment, an orthogonal projection of each of the first color resists 110R corresponds to one of the sub-pixel regions 102, and an orthogonal projection of each of the second color resists 110B corresponds to one of the sub-pixel regions 102. An orthogonal projection of each of the third color resists 110G correspond to two of the sub-pixel regions 102. That is, areas of the first color resists 110R and the second color resists 110B are substantially equal to areas of regions having filtering function in the sub-pixel regions 102, and areas of the third color resists 110G are substantially equal to twice of the areas of the regions having filtering function in the sub-pixel regions 102, but the present disclosure is not limited thereto.

Since the reflectance of the first color resists 110R and the second color resists 110B are lower, darker regions caused by stripe patterns of the first color resists 110R and the second color resists 110B may be easily recognized in white state. Therefore, by making the areas of the first color resists 110R and the second color resists 110B smaller than the areas of the third color resists 110G, the stripe pattern of the first color resists 110R and the second color resists 110B shown in white state can be avoided.

As shown in FIG. 1, the color filter array 110 has rows r1~r6 arranged along the first direction D1 and columns n1~n3 arranged along the second direction D2. In the present embodiment, the first color resists 110R and the second color resists 110B are continuously arranged along the first diagonal direction D3, and the first color resists 110R and the second color resists 110B are continuously arranged along the second diagonal direction D4. In other words, adjacent two of the first color resists 110R are located at different columns and different rows, and adjacent two of the second color resists 110B are located at different columns and different rows. The "continuously" herein means that there is no other color resist located between adjacent two of the color resists having the same color. For example, adjacent two of the second color resists 110B located at different columns (i.e., column n2, n3) are must locate at different rows (i.e., rows r4, r5) that are adjacent to each other.

For example, a filtering unit U includes six first color resists 110R, six second color resists 110B, and three third color resists 110G. The first color resist 110R located at the column n2 and the row r1 and the first color resist 110R located at the column n1 and the row r2 are adjacently arranged along the first diagonal direction D3. The second color resist 110B located at the column n2 and the row r5 and the second color resist 110B located at the column n3 and the row r6 are adjacently arranged along the second diagonal direction D4.

Each of the first color resists 110R has two sides connected with each other, and two of the second color resists 110B are respectively arranged adjacent to the two sides. For example, the lower side and the left-hand side of the first color resist 110R located at the column n2 and the row r1 are arranged adjacently with two of the second color resists 110B. Similarly, each of the second color resists 110B has two sides connected with each other, and two of the first color resists 110R are respectively arranged adjacent to the two sides. For example, the lower side and the right-hand side of the second color resist 110B located at the column n2 and the row r5 are arranged adjacently with two of the first color resists 110R.

In the present embodiment, the third color resists 110G are continuously arranged along the first diagonal direction D3, but the third color resists 110G are not continuously arranged along the second diagonal direction D4. Accordingly, the first color resists 110R and the second color resists 110B are alternatively arranged, and the third color resists 110G are merely diagonally arranged. As such, the first color resist 110R and the second color resist 110B that are alternative with each other can reduce the arrangement regularity of the color filter array 110 so as to avoid texture pattern of the first color resist 110R and the second color resist 110B shown in white state.

When there is a pattern whose size is close to one sub-pixel region 102 shown in black and white picture, and the sub-pixel region 102 corresponds to one of the color resist of the color filter array 110 having greater area, colors may be easily shown in the display screen. Therefore, possibility of achieving white balance can be increased by reducing lengths of the first color resist 110R and the second color resist 110B and by changing the arrangement, and therefore colors of the color resist can be prevented from showing in the display screen.

As shown in FIG. 1, in the present embodiment, each of the third color resists 110G has two long sides opposite with each other, and each of the long sides is arranged adjacent to one of the first color resists 110R and one of the second color resists 110B. For example, the filtering unit U includes a third color resist 110G located at the column n2 and the rows r3~r4, and this third color resist 110G has two long sides. The two long sides of the third color resist 110G are respectively adjacent to one of the first color resists 110R and one of the second color resists 110B, and the two first color resists 110R and the two second color resists 110B are alternatively arranged. In other words, there is a 2×2 array formed by two first color resists 110R and two second color resists 110B alternatively arranged located between two of the third color resists 110G along the second direction D2.

Figure 3:
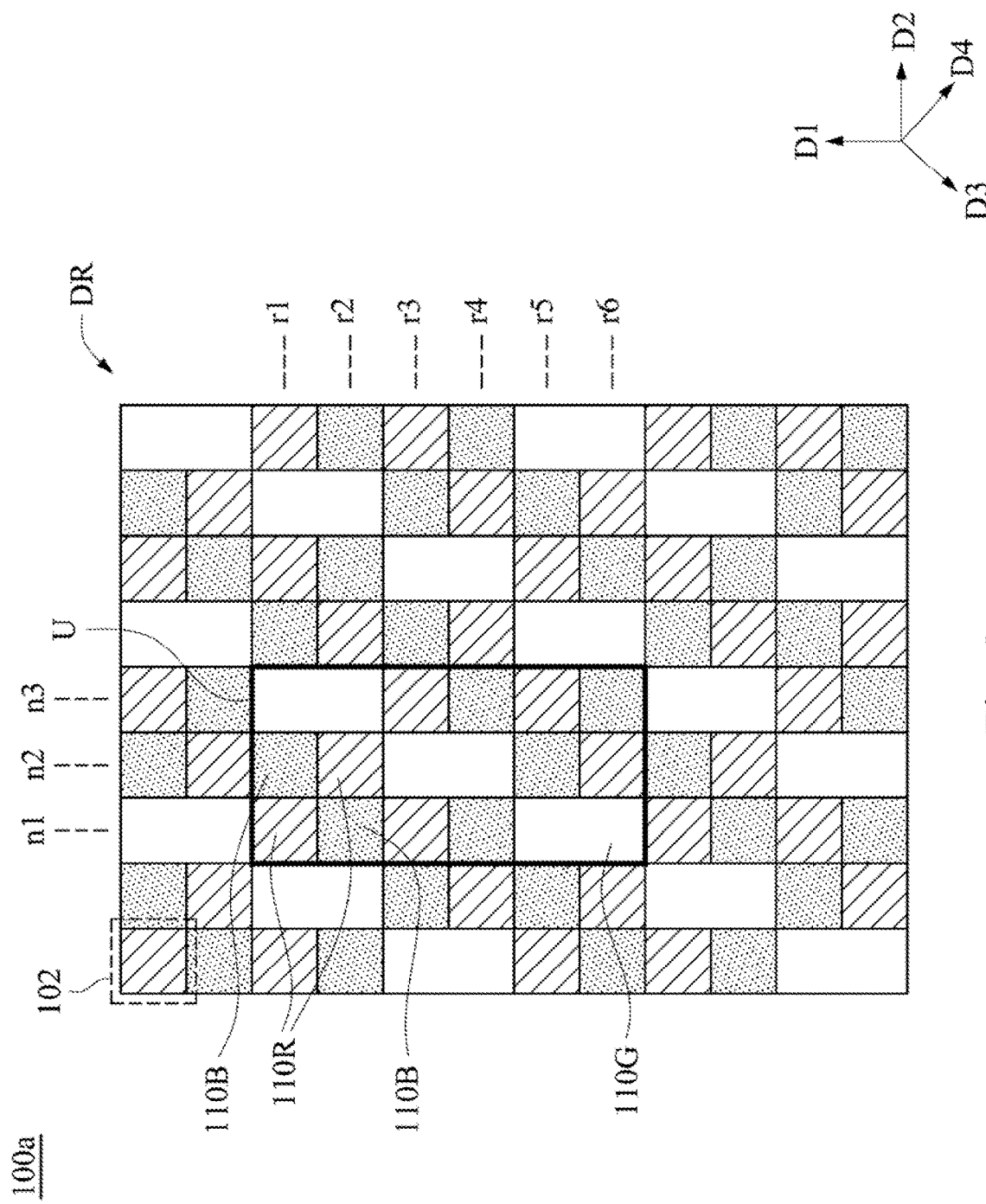
FIG. 3 is a top view of a color electrophoretic display according to another embodiment of the present disclosure.

FIG. 3 is a top view of a color electrophoretic display 100a according to another embodiment of the present disclosure. The color electrophoretic display 100a is substantially the same as the color electrophoretic display 100, and the difference is the arrangement method of the first color resists 110R and the second color resists 110B. For example, the filtering unit U includes a third color resist 110G located at the column n2 and the rows r3~r4, and this third color resist 110G has two long sides. The two long sides of the third color resist 110G are respectively adjacent to one of the first color resists 110R and one of the second color resists 110B, and the two first color resists 110R and the two second color resists 110B are arranged in parallel. In other words, the arrangement method of the 2×2 array formed by two first color resists 110R and two second color resists 110B is different from the arrangement method of the embodiment in FIG. 1. The color electrophoretic display 100a has the same technique advantages as those of the color electrophoretic display 100, and the description is not repeated hereinafter.

Figure 4B:
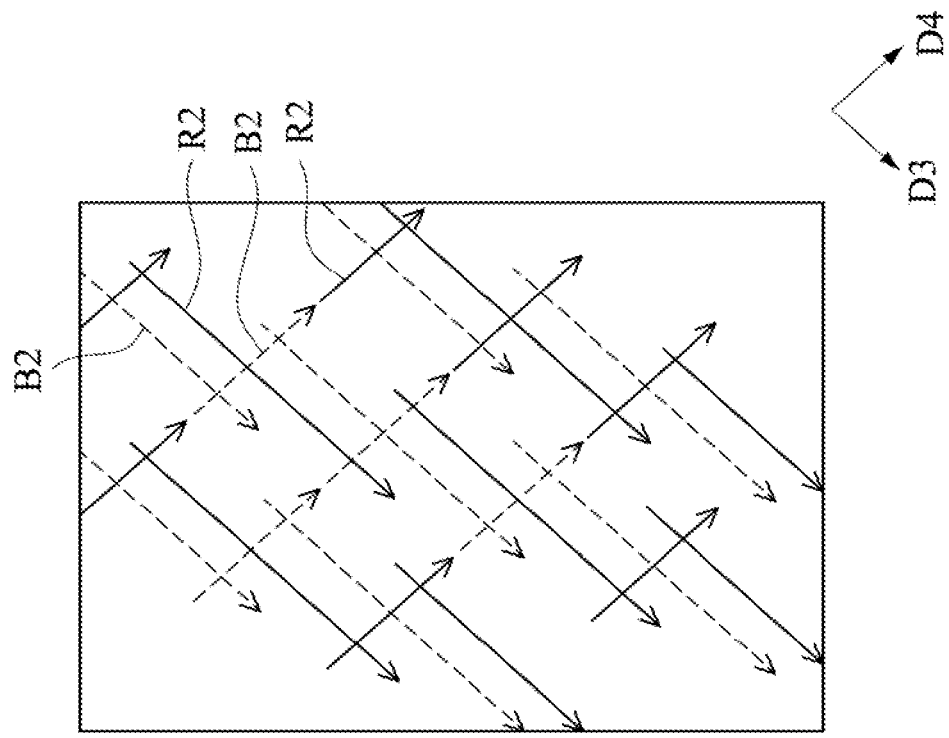
FIG. 4B is a schematic of distribution of the first color resists and the second color resists of a color electrophoretic display of the color electrophoretic display in FIG. 1.
Figure 4A:
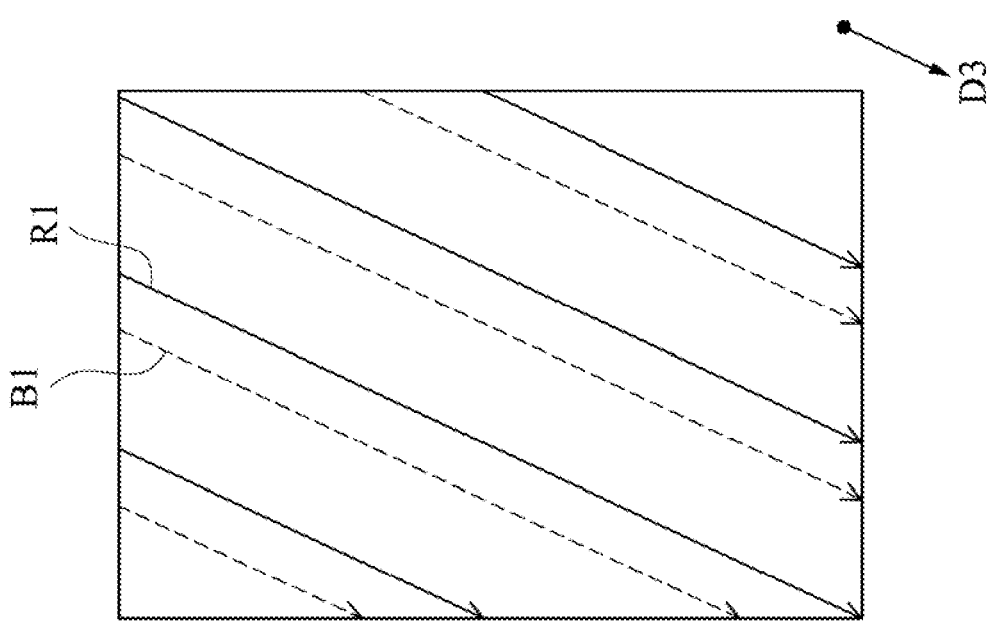
FIG. 4A is a schematic of distribution of the first color resists and the second color resists of a conventional color electrophoretic display.

FIG. 4A is a schematic of distribution of the first color resists and the second color resists of a conventional color electrophoretic display. FIG. 4B is a schematic of distribution of the first color resists 110R and the second color resists 110B of the color filter array 110 in FIG. 1. As shown in FIG. 4A, the arrow R1 illustrated the distribution of the red color resists of a conventional color electrophoretic display, and the arrow B1 illustrated the distribution of the blue color resists. The arrow R1 and the arrow B1 both extend along the first diagonal direction D3, and therefore the texture pattern may be shown in white state easily due to high arrangement regularity of the color resists. The red color resists and the blue color resists are adjacently arranged, and therefore obvious darker region may be shown in white state and be recognized easily.

As shown in FIG. 4B, the arrow R2 illustrated the distribution of the first color resists 110R, and the arrow B2 illustrated the distribution of the second color resists 110B. The arrow R2 and the arrow B2 distribute along the first diagonal direction D3 and the second diagonal direction D4, and the lengths of the arrow R2 and the arrow B2 are shorter. Accordingly, the arrangement regularity can be reduced so as to avoid texture pattern of the first color resist 110R and the second color resist 110B shown in white state.

In summary, since the reflectance of the first color resists and the second color resists are lower, and the area of the first color resists and the area of the second color resists are smaller than the area of the third color resists, the texture pattern of the first color resist and the second color resist can be avoided. In addition, the arrangement regularity of the color filter array can be reduced by making the first color resist and the second color resist arranged alternatively so as to avoid texture pattern of the first color resist and the second color resist shown in white state. Since the first color resists and the second color resists whose area are smaller have are not arranged regularly, possibility to achieve white balance can be increased when there is a pattern whose size is close to one sub-pixel region shown in black and white picture, and therefore colors of the color resist can be prevented from showing in the display screen.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A color filter array, comprising:
    a plurality of first color resists having a first color;
    a plurality of second color resists having a second color different from the first color; and
    a plurality of third color resists having a third color different from the first color and second color, wherein a reflectance of the third color resists is greater than a reflectance of the first color resists and a reflectance of the second color resists, the first color resists are continuously arranged along a first diagonal direction and a second diagonal direction, the third color resists are arranged along the first diagonal direction continuously, and the third color resists are not arranged along the second diagonal direction continuously.

2. The color filter array of claim 1, wherein the second color resists are continuously arranged along the first diagonal direction and the second diagonal direction.

3. The color filter array of claim 1, wherein an area of each of the third color resists is greater than an area of each of the first color resists and each of the second color resists.

4. The color filter array of claim 1, wherein each of the first color resists has two sides connected with each other, and two of the second color resists are respectively arranged adjacent to the two sides.

5. The color filter array of claim 1, wherein each of the second color resists has two sides connected with each other, and two of the first color resists are respectively arranged adjacent to the two sides.

* * * * *